A. W. COOKSEY.
SIPHONIC WATER CLOSET.
APPLICATION FILED SEPT. 17, 1910.
1,008,787.
Patented Nov. 14, 1911.
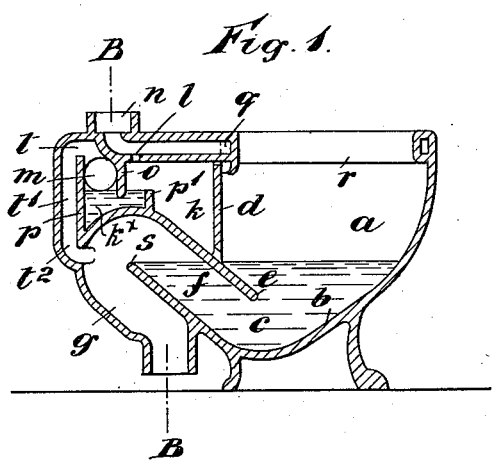
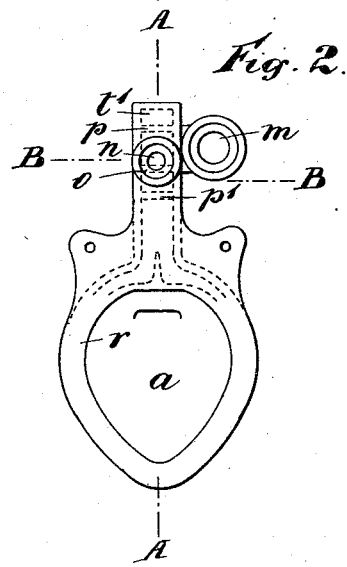
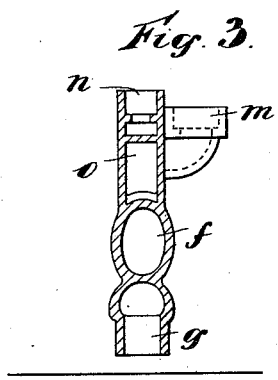
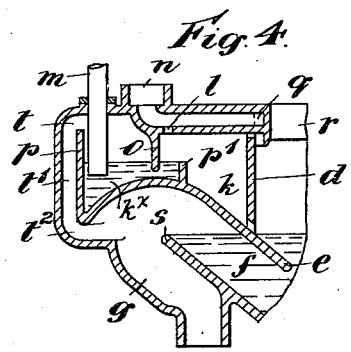
Witnesses.
Inventor.

UNITED STATES PATENT OFFICE.

ARTHUR WILLIAM COOKSEY, OF LONDON, ENGLAND.

SIPHONIC WATER-CLOSET.

1,008,787.     Specification of Letters Patent.    Patented Nov. 14, 1911.

Application filed September 17, 1910. Serial No. 582,460.

*To all whom it may concern:*

Be it known that I, ARTHUR WILLIAM COOKSEY, a subject of the King of Great Britain, residing at London, England, have invented new and useful Improvements in Siphonic Water-Closets, of which the following is a specification.

This invention relates to improvements in that description of siphonic water closet in which the upper part of the trap extends in an upward direction and opens into a valve chamber, to the top of which valve chamber are connected the anti-siphonage or ventilating pipe and the water supply pipe. The orifices of these two pipes are separated by a downwardly projecting leaf which is suitably shaped to support and guide a floating ball-valve. Or as an alternative arrangement a flap valve may be used. In either arrangement the valve is designed to close the orifice of the anti-siphonage or ventilating pipe so as to stop its anti-siphoning action when the level of water in the valve-chamber is raised during the flushing operation, and to uncover such orifice so as to allow the anti-siphoning action to be restored when the said level falls after the completion of the flush.

The object of my present invention is to dispense with the beforementioned valve, and for this purpose I employ arrangements of the kind illustrated in the accompanying sheet of drawings, in which—

Figure 1 is a sectional elevation taken on the line A—A of Fig. 2 of a water closet constructed in accordance with my present invention, Fig. 2 a plan of same, Fig. 3 a sectional elevation taken on the line B—B of Figs. 1 and 2, and Fig. 4 is a section similar to part of the left hand side of Fig. 1, showing a slight modification.

Similar letters of reference relate to like parts in all the figures of the drawings.

In the drawings $a$ represents the closet-basin, which is of what is known as the "wash-down" type, with the bottom $b$ sloped or curved toward the outlet $c$ at the bottom of the straight back $d$, the lower edge $e$ of which forms the dip or seal of the trap $f$ which is preferably formed integrally with the basin $a$ as shown. The outlet $g$ of the trap $f$ is disposed more or less vertically, and forms the long leg of the siphon, being suitably connected with the soil pipe by a connecting branch or otherwise according to circumstances.

The upper part of the trap $f$ extends in an upward direction and forms a chamber $k$, to the upper part of which are connected the anti-siphonage or ventilating pipe $m$ and the water supply pipe $n$. The orifices or mouths of these two pipes $m$ and $n$ which open into the upper part of the chamber $k$ are separated by a downwardly projecting leaf $o$ which dips into the water contained within a luting chamber $k^x$, thereby dividing the said chamber into two compartments and forming a seal between the same.

$q$ is an orifice communicating with the flushing rim $r$ of the basin $a$.

For the purpose of my present invention I dispense with the beforementioned valves for closing the orifice or mouth of the anti-siphonage or ventilating pipe $m$, and instead thereof I arrange the said pipe $m$ at one side of the luting chamber $k^x$ so that it opens into that compartment of the latter which is in communication with the outlet $g$ of the trap $f$. The orifice or mouth of the pipe $m$ is in such position, as shown in Figs. 1 and 3, that upon the inrush of water into the chamber $k^x$ through the passage $l$ from the water inlet $n$ part of the water rises in the said chamber between the partition $p$ and the leaf $o$ and seals the orifice or mouth of the pipe $m$ during the flushing operation. Or, instead of the anti-siphonage or ventilating pipe entering at the side of the chamber $k$ it may enter from the top, and project downwardly for a certain distance thereinto, as shown in Fig. 4 for example, so that its orifice or mouth may be sealed by the rise of water in that part of the chamber $k^x$ during the flushing operation as before.

In some cases, where silence of action is not considered to be of importance, I provide a shield or partition $p$ at the back of the basin having a discharge hole $t$ therein of such a size as will allow of the passage of a sufficient quantity of water down the passage $t^1$ formed by the said shield or partition $p$ and the back of the closet and through the hole $t^2$ to splay across the long leg $g$ of the closet siphon, and in conjunction with the similar splay of water passing through the outlet trap $f$ and over the weir $s$, to start the required siphonic action of the closet. It will be understood that this shield or partition $p$ insures that the water entering the apparatus through the inlet pipe $n$ shall be divided in due proportion, one portion passing through the flushing rim $r$ into the basin, and the other portion passing through the passage $l$ and chamber $k^x$ under the downwardly projecting leaf $o$ and over the shield or partition $p$ into the long leg of the siphon as above described.

Claims:

1. A siphonic water-closet comprising, in combination, a chamber $k$, in an upward extension of the strap, having at its upper part a luting chamber $k^x$, a water-sealed leaf $o$ projecting downwardly in said chamber, a flushing rim $r$, a water supply pipe $n$ at one side of said leaf connected by passages $q$ and $l$ with the flushing rim $r$ and luting chamber $k^x$ respectively, and an anti-siphonage or ventilating pipe $m$ at the other side of said leaf opening into the luting chamber $k^x$ so as to be sealed by a part of the flushing water delivered into the said luting chamber.

2. A siphonic water-closet comprising, in combination, a chamber $k$ in an upward extension of the trap, having at its upper part a luting chamber $k^x$, a water-sealed leaf $o$ projecting downwardly in said luting chamber, a flushing rim $r$, a water supply pipe $n$ at one side of said leaf connected by passages $q$ and $l$ with the flushing rim $r$ and luting chamber $k^x$ respectively, an anti-siphonage or ventilating pipe $m$ at the other side of said leaf opening into the luting chamber $k^x$ so as to be sealed by a part of the flushing water delivered into the said luting chamber, and a shield or partition $p$ at the back of the basin having discharge holes $t$ and $t^2$ for causing water from the luting chamber $k^x$ to splay across the long leg of the siphon, in conjunction with the similar splay through the trap to start the siphonic action.

In testimony whereof I have signed my name to this specification in the presence of two subscribing witnesses.

ARTHUR WILLIAM COOKSEY.

Witnesses:
STEPHEN EDWARD GUNYON,
FRANK WALKLING.